(12) United States Patent
Bement (10) Patent No.: US 8,928,475 B2
(45) Date of Patent: Jan. 6, 2015

(54) PROGRESSIVE BRAKING INDICATOR SYSTEM

(71) Applicant: Matthew Bement, Miami, FL (US)

(72) Inventor: Matthew Bement, Miami, FL (US)

( * ) Notice: Subject to any disclaimer, the term of this patent is extended or adjusted under 35 U.S.C. 154(b) by 43 days.

(21) Appl. No.: 13/787,017

(22) Filed: Mar. 6, 2013

(65) Prior Publication Data

US 2014/0253315 A1 Sep. 11, 2014

(51) Int. Cl.
*B60Q 1/44* (2006.01)

(52) U.S. Cl.
CPC .............. *B60Q 1/444* (2013.01); *B60Q 1/447* (2013.01)
USPC .......................................... 340/479; 340/467

(58) Field of Classification Search
CPC ......... B60Q 1/441; B60Q 1/444; B60Q 1/447
USPC .................................................. 340/479, 467
See application file for complete search history.

(56) References Cited

U.S. PATENT DOCUMENTS

| 4,600,913 | A | * | 7/1986 | Caine ............................ 340/479 |
| 6,054,919 | A | * | 4/2000 | Demko ......................... 340/479 |
| 6,100,799 | A | * | 8/2000 | Fenk ............................. 340/467 |
| 7,573,378 | B2 | * | 8/2009 | Matsumoto et al. .......... 340/479 |
| 7,782,185 | B1 | * | 8/2010 | Burns ............................ 340/479 |
| 8,050,836 | B2 | * | 11/2011 | Karnjate et al. .............. 340/479 |
| 2008/0024290 | A1 | * | 1/2008 | Tsai .............................. 340/479 |

* cited by examiner

*Primary Examiner* — John A Tweel, Jr.
(74) *Attorney, Agent, or Firm* — Mark Terry (57) ABSTRACT

A progressive braking indicator system includes a brake light assembly having multiple lights, a brake pedal for the vehicle, a sensor connected to the brake pedal for measuring a distance the brake pedal has moved and an amount of pressure applied to the brake pedal by a driver of the vehicle, and a brake control processor connected to the sensor and the at least one brake light assembly. The brake control processor is configured to: a) receive the distance and amount of pressure measured by the sensor, b) generate a signal based on the distance and amount of pressure measured by the sensor, wherein the signal is configured to illuminate a varying subset of the plurality of lights based on the distance and amount of pressure measured by the sensor. A power source connected to the at least one brake light assembly, the sensor, and the brake control processor.

4 Claims, 7 Drawing Sheets

PROGRESSIVE BRAKING INDICATOR SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the automotive field, and more specifically relates to braking indicator safety systems for vehicles.

BACKGROUND OF THE INVENTION

The lighting system of a motor vehicle consists of lighting and signaling devices mounted or integrated to the front, sides, rear, and in some cases the top of the motor vehicle. The purpose of this system is to provide illumination for the driver to operate the vehicle safely after dark, to increase the conspicuity of the vehicle, and to display information about the vehicle's presence, position, size, direction of travel, and driver's intentions regarding direction and speed of travel. Many types of lamps are used for turn signal, brake lamps, side and clearance marker lamps, and interior lamps.

Red steady-burning rear lights, brighter than the rear position lamps, are activated when the driver applies the vehicle's brakes. These are called "stop lamps" or "brake lights." Brake lights may also include a central brake lamp, mounted higher than the vehicle's left and right brake lamps, also called a center brake light. The center brake light is intended to provide a deceleration warning to following drivers whose view of the vehicle's left and right stop lamps is blocked by interceding vehicles. It also helps to disambiguate brake vs. turn signal lights, where red rear turn signals identical in appearance to stop lamps are permitted, and also can provide a redundant stop light signal in the event of a stop lamp malfunction. The center brake light is generally required to illuminate steadily and not permitted to flash.

One of the shortcomings of conventional braking indicator safety systems is that although the systems illuminate a vehicle's brake lights, they fail to indicate to other vehicles with great precision the level of intensity the deceleration of the vehicle will occur. Another shortcoming of conventional braking indicator systems is that they are activated solely based on the braking induced by the driver of the vehicle. Yet another shortcoming of conventional braking indicator systems is that they do not alert other vehicles with the precise braking patterns of the driver of a forward vehicle in terms of whether the driver is tapping on the brake pedal, slamming on the brake pedal or is simply engaged in a gradual depressing of the brake pedal.

Therefore, a need exists to overcome the problems with the prior art as discussed above, and particularly for a more efficient way of providing more accuracy in a braking indicator safety system.

SUMMARY OF THE INVENTION

The progressive braking indicator system is directed to a combination of a braking indicator safety system which satisfies the need for providing the drivers of vehicles with a greater understanding of the various braking scenarios caused by the vehicle in front, and thus, greatly decrease any rear end collisions. The progressive braking indicator system may alleviate traffic environment frustrations, substantially increase the safety standards of vehicles, prevent potential expenditures associated with damage of the vehicle caused by rear end collisions and reduce the insurance claims of damaged vehicles caused by rear end collisions.

The progressive braking indicator system can vastly improve the conventional braking indicator safety system, provide more potential sources as alternatives which can activate the said invention independently or in combination of the driver's actions, and thus, immensely help the driver of the vehicle maintain the physical integrity and monetary value of the vehicle.

The progressive braking indicator system includes at least one brake light assembly comprising a plurality of lights, a brake pedal for the vehicle, a sensor connected to the brake pedal for measuring a distance the brake pedal has moved and an amount of pressure applied to the brake pedal by a driver of the vehicle, a brake control processor connected to the sensor and the at least one brake light assembly, wherein the brake control processor is configured to: a) receive the distance and amount of pressure measured by the sensor, b) generate a signal based on the distance and amount of pressure measured by the sensor, wherein the signal is configured to illuminate a first set of the plurality of lights if the distance is greater than a first distance threshold and the amount of pressure is greater than a first pressure threshold, wherein the signal is configured to illuminate a second set of the plurality of lights greater than the first set, if the distance is greater than a second distance threshold and the amount of pressure is greater than a second pressure threshold, and wherein the signal is configured to illuminate a third set of the plurality of lights greater than the second set, if the distance is greater than a third distance threshold and the amount of pressure is greater than a third pressure threshold, and c) transmit the signal to the at least one brake light assembly, and a power source connected to the at least one brake light assembly, the sensor, and the brake control processor.

The foregoing and other features and advantages will be apparent from the following more particular description of the preferred embodiments, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

In accordance with the embodiments described herein, a progressive braking indicator system disclosed that overcomes the problems with the prior art as discussed above, by providing a braking indicator system that functions as a safety feature for vehicles by notifying the drivers of other vehicles, the progressive rates of various braking patterns of the forward vehicle and the subsequent deceleration of the forward vehicle therein. As an improvement over conventional safety braking systems, the progressive braking indicator system allows the user to utilize the progressive braking indicator system with a variety of potential sources. The progressive braking indicator system can be activated by a driver of a vehicle, a brake control processor and an adaptive control braking system. The progressive braking indicator system decreases rear end collisions, alleviates traffic frustrations, restores resale value of vehicles by preventing any potential damage caused by rear end collisions, prevents increased insurance costs caused due to rear end collisions and increases the overall safety standard in a vehicular commute environment.

Also, the progressive braking indicator system provides a system with a minimal number of component parts, thereby reducing the potential for failure or malfunction of its combination parts. Also, the minimal number of component parts allows for quick and inexpensive fabrication of the combination parts, thereby meeting the economic requirements for an interchangeable system that allows for purchase of multiple combination parts in the progressive braking indicator system. The progressive braking indicator system includes component and combination parts that can be constructed of various metals and materials.

The progressive braking indicator system alleviates the shortcomings by forewarning to the drivers behind the forward vehicle, the precise level of intensity of deceleration to be expected, thus allowing other reactive drivers to brake and decelerate with a far superior knowledge in context to the surrounding driving conditions. The progressive braking indicator system reduces rear end collisions caused by sudden braking or deceleration of forward vehicles because it will allow the driver of the vehicle behind the forward vehicle to react with certainty and time based on each known progressive illumination braking pattern scenario. The progressive braking indicator system alleviates vehicular traffic frustrations that are common in a driving environment by keeping the driver of the vehicle calm, collective and relaxed due to the advanced familiarity in the braking pattern illumination.

The progressive braking indicator system decreases potential repair expenditures, reduces insurance claims, and helps maintain the physical integrity and the resale value of the vehicle by preventing or reducing rear end collisions caused by braking or deceleration of vehicles. The progressive braking indicator system promotes overall safety of vehicular environment and safety remains consistent as a result of activation initiated by variety of potential sources. Lastly, the progressive braking indicator system is easily maneuverable, easily transportable, inexpensive to manufacture and lightweight in its physical characteristics.

Figure 1:
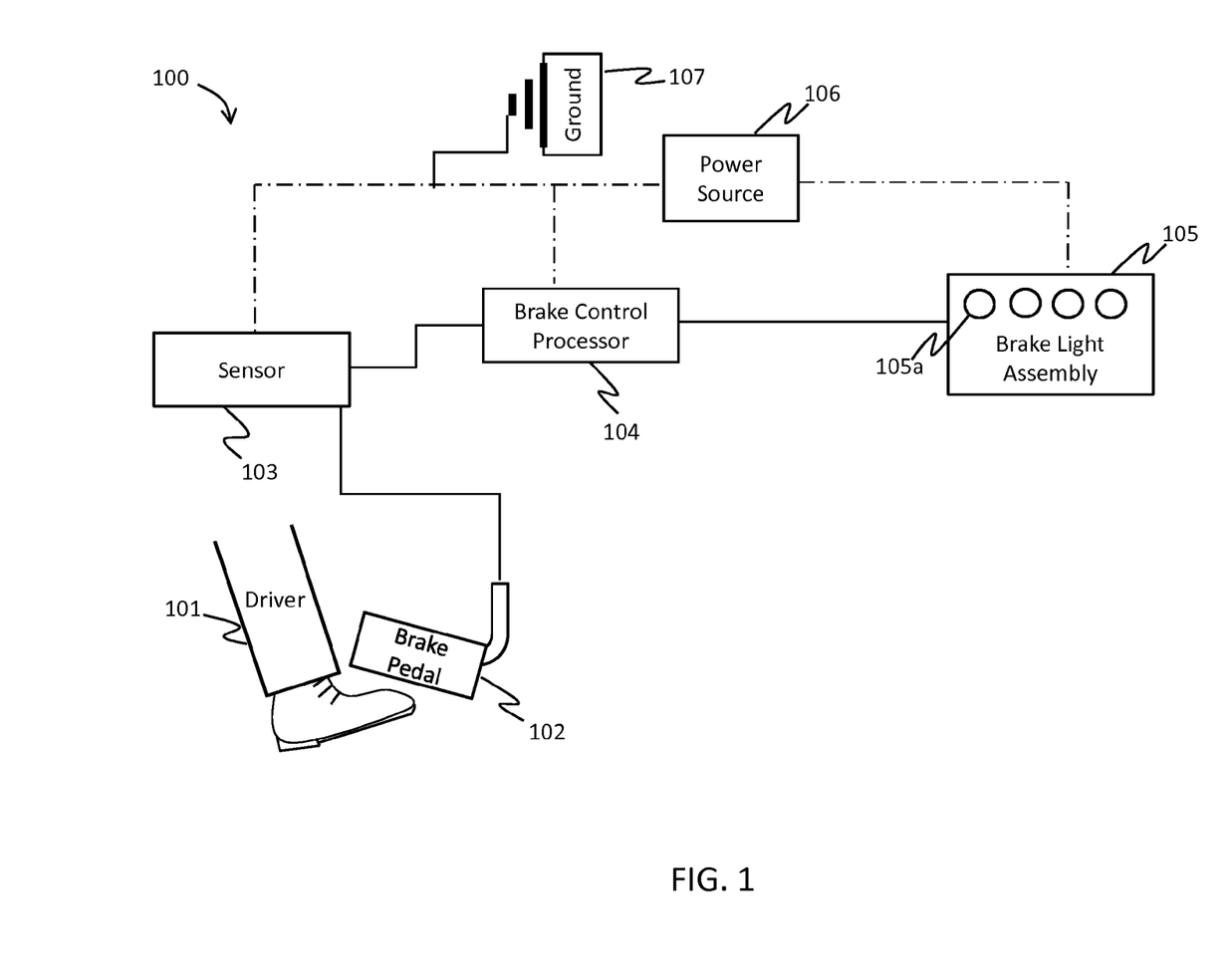
FIG. 1 is a block diagram illustrating the progressive braking indicator system when non-activated, in accordance with one embodiment.

The embodiments of the progressive braking indicator system will be described heretofore with reference to FIGS. 1 through 7 below. FIG. 1 is a block diagram illustrating the progressive braking indicator system 100 when non-activated, in accordance with one embodiment. The progressive braking indicator system 100 may be composed in combination with a driver 101 of a vehicle, a brake pedal 102 of the vehicle, a sensor 103 connected to the brake pedal 102, a brake control processor 104 connected to the sensor 103, at least one brake light assembly 105 connected to the brake control processor 104, and a power source 106 connected to the sensor 103, to the brake control processor 104 and to the brake light assembly 105. The power source 106 may provide power to the sensor 103, the brake control processor 104 and the brake light assembly 105. The ground 107 may connected to the brake control processor 104, the sensor 103 and the brake light assembly 105 for grounding power generated by the power source 106 in order to prevent unwarranted electrocution. The processor 104 may be a central processing unit, microprocessor, integrated circuit, programmable device or computer 600, described in greater detail below.

The sensor 103 may comprise one or more sensors including: 1) a positional sensor that measures a distance the brake pedal 102 has moved from its original position along an axis, 2) a speed sensor that measures a speed of the brake pedal 102 when it is moved by the driver 101 or another entity, 3) an acceleration/deceleration sensor that measures an acceleration/deceleration of the brake pedal 102 when it is moved by the driver 101 or another entity, 4) a force sensor that measures an amount of force placed on the brake pedal 102 by the driver 101 or another entity, and/or 5) a pressure sensor that measures an amount of pressure placed on the brake pedal 102 by the driver 101 or another entity. The brake light assembly 105 may include a plurality of lights 105a, which may comprise LEDs, standard bulbs or the like.

Figure 2:
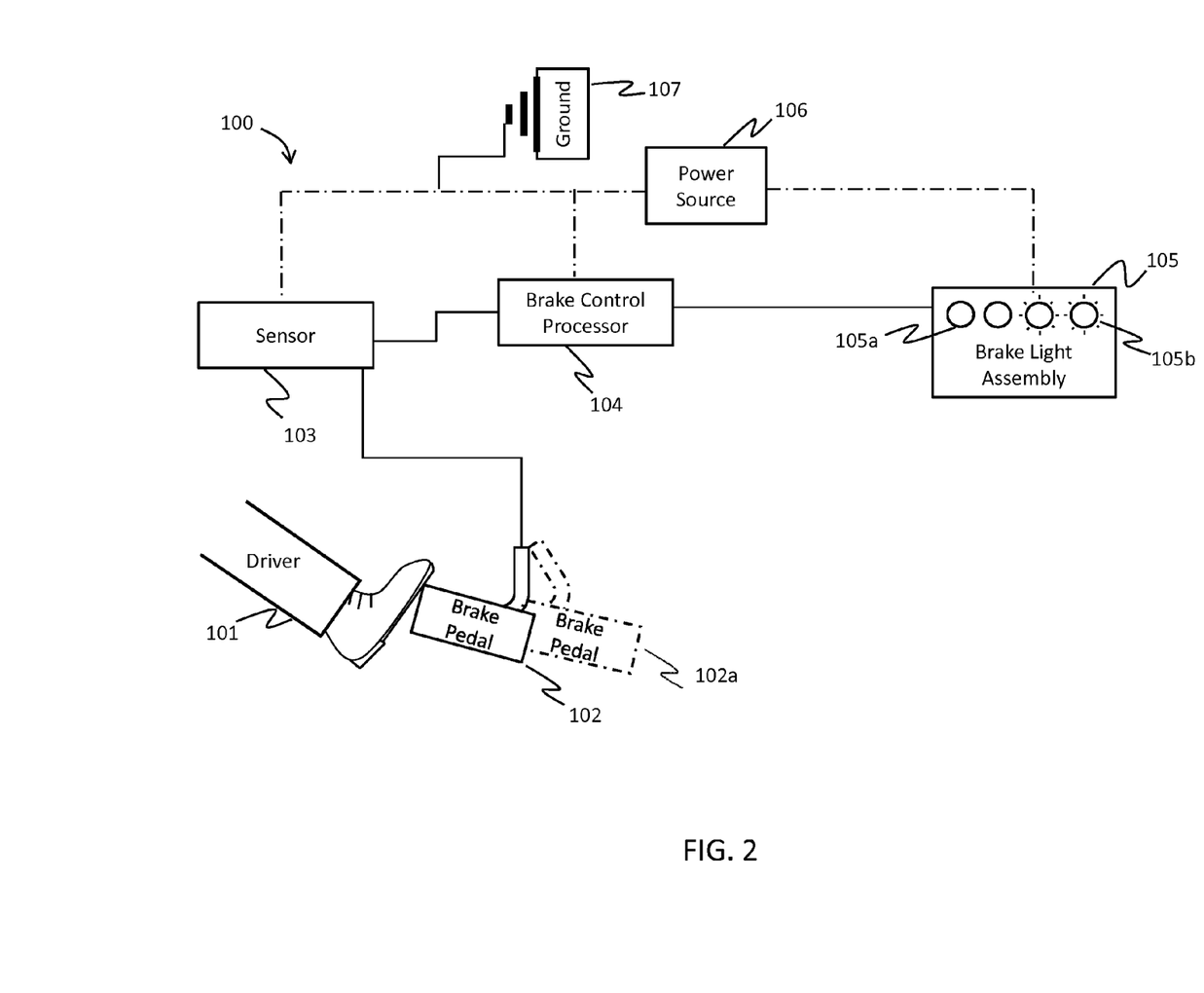
FIG. 2 is a block diagram illustrating the progressive braking indicator system when activated, in accordance with one embodiment.

FIG. 2 is a block diagram illustrating the progressive braking indicator system 100 when activated by the driver 101 of the vehicle depressing the brake pedal 102, in accordance with one embodiment. When the brake pedal 102 is placed in a depressed position 102a by the driver 101, the position, pressure, force, speed and/or acceleration of or on the brake pedal 102 may be measured by the sensor 103. The sensor 103 then may produce at least one output signal, the output signal contains information on the position, pressure, force, speed and/or acceleration of or on the brake pedal 102, as a result of the actions of the driver 101 of the vehicle. The brake control processor 104 may be connected to the sensor 103, wherein the sensor 103 transfers the output signal to the brake control processor 104. The brake control processor 104 may receive and decipher and/or process the output signal, wherein the output signal may be analyzed by the brake control processor 104 to generate at least one electronic signal, which is configured to actuate certain lights 105b of the plurality of lights 105a in the brake light assembly 105.

The brake control processor 104 may be connected to the light assembly 105 and may activate the brake light assembly 105 via the electronic signal (described in more detail below). The electronic signal may contain information received by the brake control processor 104 from the sensor 103. At least one bulb 105b in the brake light assembly 105 may then illuminate with a level of intensity or blink according to the electronic signal.

Figure 3:
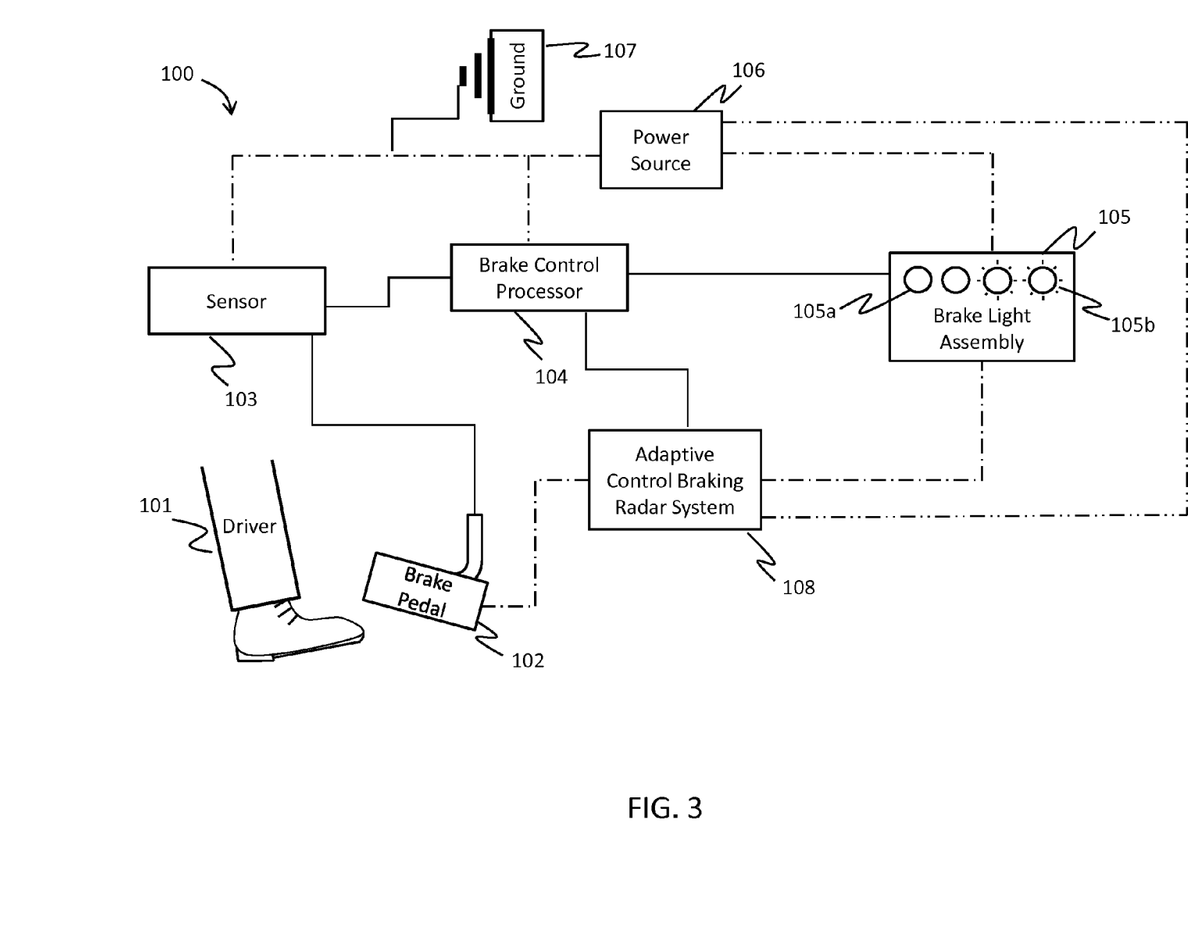
FIG. 3 is block diagram illustrating the progressive braking indicator system in conjunction with an adaptive control radar braking system, in accordance with one embodiment.

FIG. 3 is block diagram illustrating the progressive braking indicator system 100 in conjunction with an adaptive control radar braking system 108, in accordance with one embodiment. The adaptive control radar braking system 108 is a control system for road vehicles that automatically adjusts the vehicle speed to maintain a safe distance from vehicles ahead. Control is imposed based on sensor information from on-board sensors. The adaptive control radar braking system 108 uses either a radar or laser sensor setup allowing the vehicle to slow when approaching another vehicle ahead and accelerate again to the preset speed when traffic allows. The adaptive control radar braking system 108 may feature a pre-crash system, which warns the driver and/or provides brake support if there is a high risk of a collision. It may also include a lane maintaining system which provides power steering assist to reduce steering input burden in corners when the cruise control system is activated. The adaptive control braking radar system 108 may be any such adaptive control braking radar system known to one of ordinary skill in the art.

The progressive braking indicator system 100 may be activated by the adaptive control radar braking system 108 in accordance with one embodiment. The adaptive control braking radar system 108 may be connected to the brake control processor 104 and/or connected directly to the brake light assembly 105 and/or connected directly to the brake pedal 102. In one embodiment, the adaptive control braking radar system 108 receives radar data and identifies a braking scenario based on the radar data. Subsequently, adaptive control braking radar system 108 generates a message that identifies or describes the braking scenario and send the message to the processor 104. The brake control processor 104 may then generate at least one electronic signal based on the message. The brake control processor 104 may be connected to the light assembly 105 and may activate the brake light assembly 105 via the electronic signal (described in more detail below). The electronic signal may contain information received by the brake control processor 104 from the adaptive control braking radar system 108, such as the intensity of the braking scenario. At least one bulb 105b in the brake light assembly 105 may then illuminate with a level of intensity or blink according to the intensity of the braking scenario defined in the electronic signal.

A braking scenario is a description of braking that is occurring or will be occurring. Braking scenarios may have different intensities. A braking scenario that defines a situation where a small amount of braking is occurring or will be occurring over a long period of time is a low intensity braking scenario. A braking scenario that defines a situation where a large amount of braking is occurring or will be occurring over a very short period of time is a high intensity braking scenario representing a high amount of danger. Different intensity thresholds may be predefined, which delineate what constitutes a low intensity, medium intensity or high intensity threshold.

In another embodiment, the adaptive control braking radar system 108 receives radar data and identifies a braking scenario based on the radar data. Subsequently, adaptive control braking radar system 108 generates a message or electronic signal that identifies or describes the braking scenario and send the message to the brake light assembly 105 via the electronic signal. At least one bulb 105b in the brake light assembly 105 may then illuminate with a level of intensity or blink according to the electronic signal.

In yet another embodiment, the adaptive control braking radar system 108 receives radar data and identifies a braking scenario based on the radar data. Subsequently, adaptive control braking radar system 108 is further configured for activating the brake pedal 102 based on the radar data, wherein the brake pedal 102 is activated to a first distance (i.e., it is depressed to a first distance) if the radar data defines a braking scenario that exceeds a first intensity threshold, wherein the brake pedal 102 is activated to a second distance, if the radar data defines a braking scenario that exceeds a second intensity threshold, and wherein the brake pedal 102 is activated to a third distance, if the radar data defines a braking scenario that exceeds a third intensity threshold.

Figure 4:
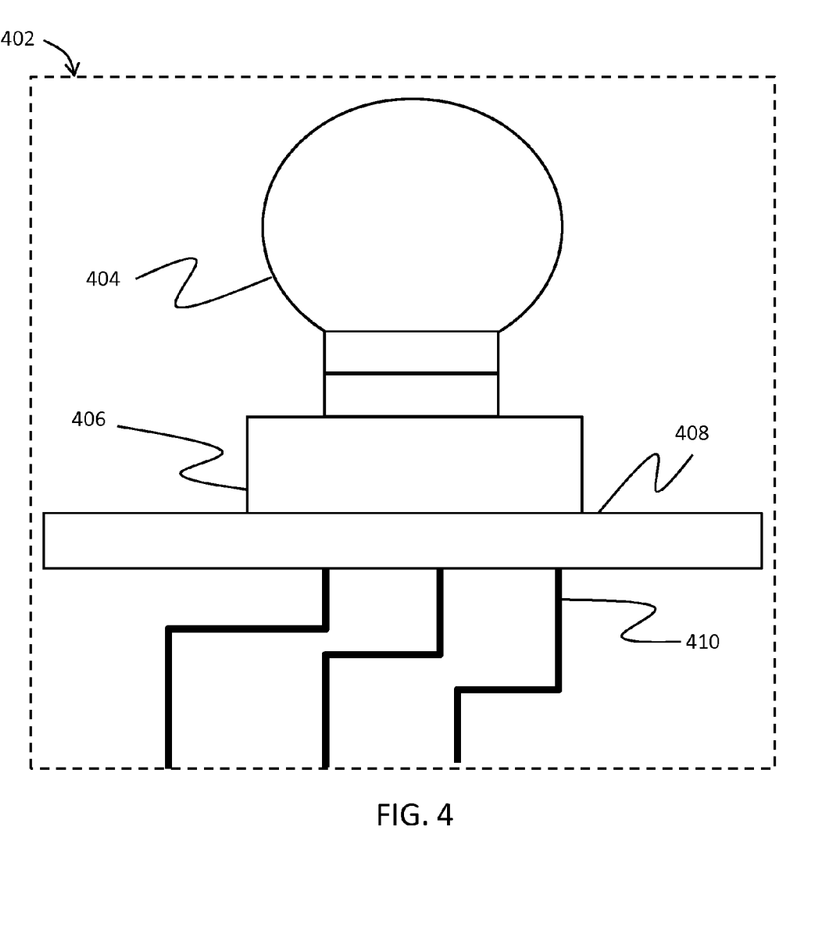
FIG. 4 is an illustration of a light of the brake light assembly of the progressive braking indicator system, in accordance with one embodiment.

FIG. 4 is an illustration of a light 402 of the brake light assembly 105 of the progressive braking indicator system, in accordance with one embodiment. FIG. 4 shows that the light 402 includes a bulb 404, socket 406, a printed circuit board 408 and a plurality of terminals or couplers 410. The printed circuit board 408, the couplers 410, the socket 406 and the bulb 404 may be interconnected with each other. The brake control processor 104 may activate the printed circuit board 408 via the electronic signal the processor 104 generates. The printed circuit board 408 receives the signal from the processor 104, interprets the signal and consequently illuminates and/or blinks the bulb 404 according to the data in the signal received from the processor 104.

The printed circuit board 408 has the ability to illuminate the bulb 404 at different intensities, such as different dimming or brightness/lumen profiles. Also, the printed circuit board 408 has the ability to blink the bulb 404 using different sequences such as using different periods and/or using a strobe effect. The bulb 404 may be red, white, intense white or the like.

Figure 5:
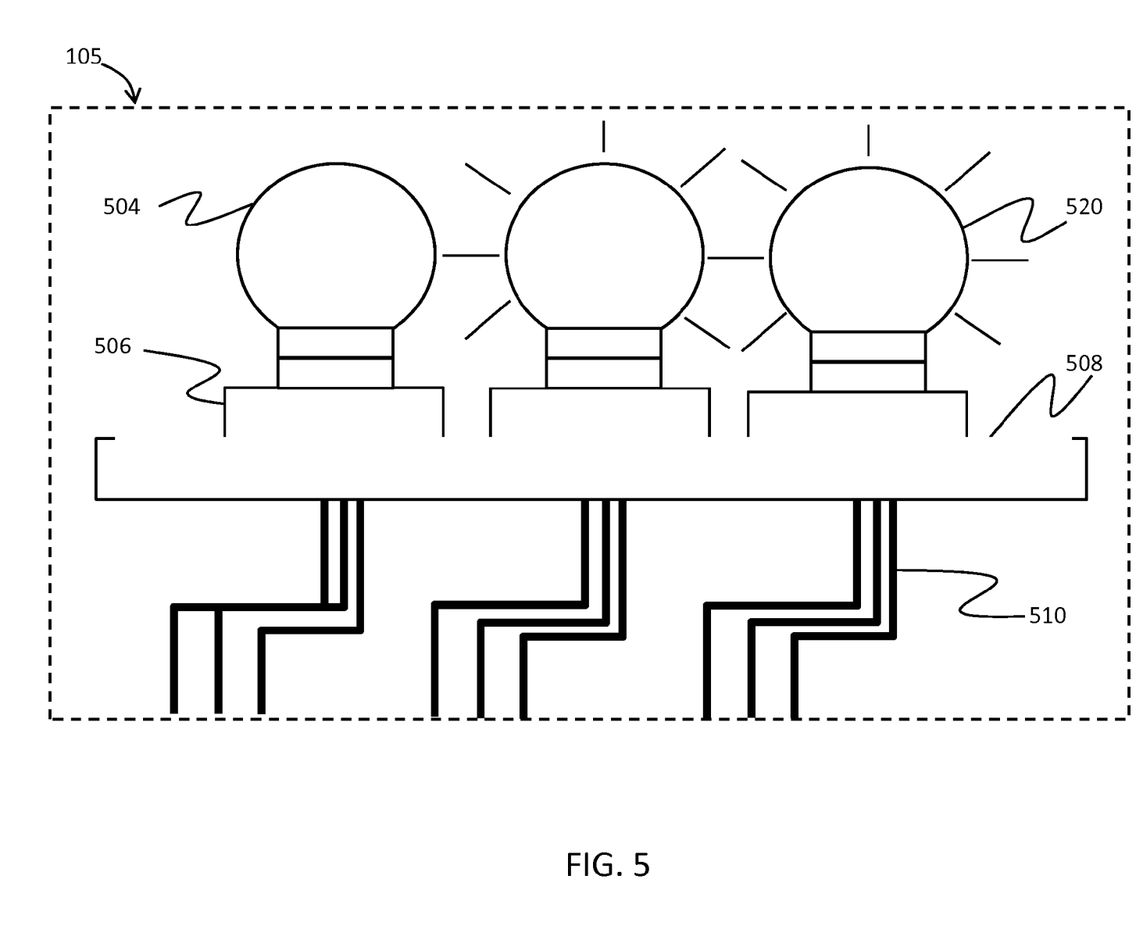
FIG. 5 is an illustration of the brake light assembly of the progressive braking indicator system, in accordance with one embodiment.

FIG. 5 is an illustration of the brake light assembly 105 of the progressive braking indicator system 100 of FIG. 1, in accordance with one embodiment. The brake light assembly 105 comprises of a plurality of bulbs 504, a plurality of sockets 506 into which bulbs are inserted, a printed circuit board 508 and a plurality of couplers 510. The printed circuit board 508, the couplers 510, the sockets 506 and the bulbs 504 may be interconnected to each other. The brake control processor 104 may activate the printed circuit board 508 via the electronic signal the processor 104 generates. The printed circuit board 508 receives the signal from the processor 104, interprets the signal and consequently illuminates and/or blinks a subset 520 of the bulbs 504 according to the data in the signal received from the processor 104.

The printed circuit board 508 has the ability to illuminate different ones of the bulbs 504 at different intensities, such as different dimming or brightness/lumen profiles. Also, the printed circuit board 508 has the ability to blink different ones of the bulbs 504 using different sequences such as using different periods and/or using a strobe effect. The bulbs 504 may have different colors, such as red, white, intense white or the like, and may have different intensities, such as different dimming or brightness/lumen profiles.

In one example, the brake light assembly 105 includes three lights 504 wherein the first two lights are standard red lights and the last light is a white light. In this example, the brake light assembly 105 receives a signal from the brake control processor 104 wherein the signal describes which lights to illuminate and how. Recall that the brake control processor 104 generates a signal based on the data it has received from the sensor 103, such as data relating to the pressure placed on the brake pedal 102 and distance traveled by the brake pedal 102.

In one alternative to this example, the signal sent to the brake light assembly 105 is configured to illuminate a first set of the plurality of lights if the distance (measured by the sensor 103) is greater than a first distance threshold and the amount of pressure (measured by the sensor 103) is greater than a first pressure threshold. The first set of lights may comprise only the first red light illuminated at a low or medium intensity or brightness. In another alternative to this example, the signal sent to the brake light assembly 105 is configured to illuminate a second set of the plurality of lights greater than the first set, if the distance is greater than a second distance threshold and the amount of pressure is greater than a second pressure threshold. The second set of lights may comprise only the first two red lights, wherein the first red light is illuminated at a high intensity or brightness and the second red light is illuminated at a low or medium intensity or brightness. In another alternative to this example, the signal sent to the brake light assembly 105 is configured to illuminate a third set of the plurality of lights greater than the second set, if the distance is greater than a third distance threshold and the amount of pressure is greater than a third pressure threshold. The third set of lights may comprise all three lights, wherein the first two red lights are illuminated at a high intensity or brightness and the last white light is illuminated at a high intensity or brightness and/or the white light blinks or exhibits a strobe light effect.

In one embodiment, the white light described above may comprise one or more lights that pertain to the reversing lamps or reverse lights of the vehicle. Reverse lights of a vehicle provide illumination to the rear when backing up, and to warn adjacent vehicle operators and pedestrians of a vehicle's rearward motion. Reverse lights are rear-mounted, rear-facing reversing lamps (or "backup lights"). In this embodiment, the brake light assembly 105 and a separate reverse light assembly (composed similarly to the brake light assembly 105 but not shown in the figures) receive a signal from the brake control processor 104 wherein the signal describes which lights to illuminate and how. In this embodiment, the brake light assembly 105 would illuminate/blink red lights and the separate reverse light assembly would illuminate/blink one or more white lights.

Figure 6:
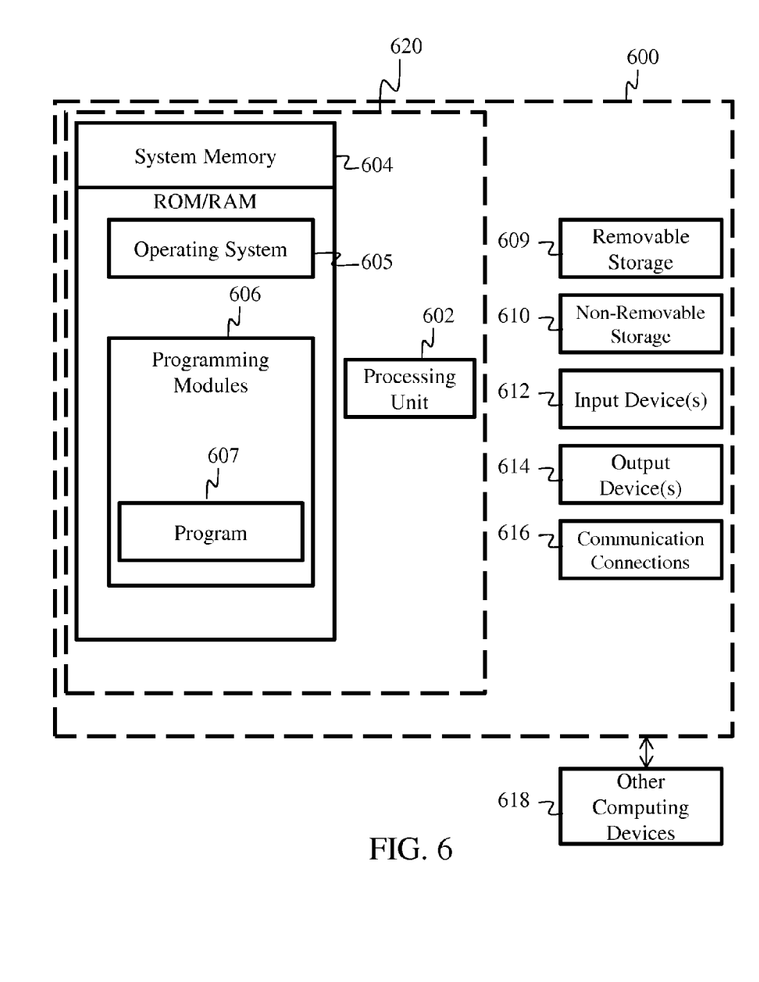
FIG. 6 is a block diagram of an example of a computer and other computing devices, in accordance with one embodiment.

FIG. 6 is a block diagram of an example of a computer 600 and other computing devices, in accordance with one embodiment. FIG. 6 is a block diagram of a system including an example computing device 600 and other computing devices. Consistent with the embodiments described herein, the aforementioned actions performed by processors 104, 408, 508 and 108 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for method 700 as described below. Method 700 may operate in other environments and is not limited to computing device 600.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of program logic 150. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of method 700's stages as described above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 7:
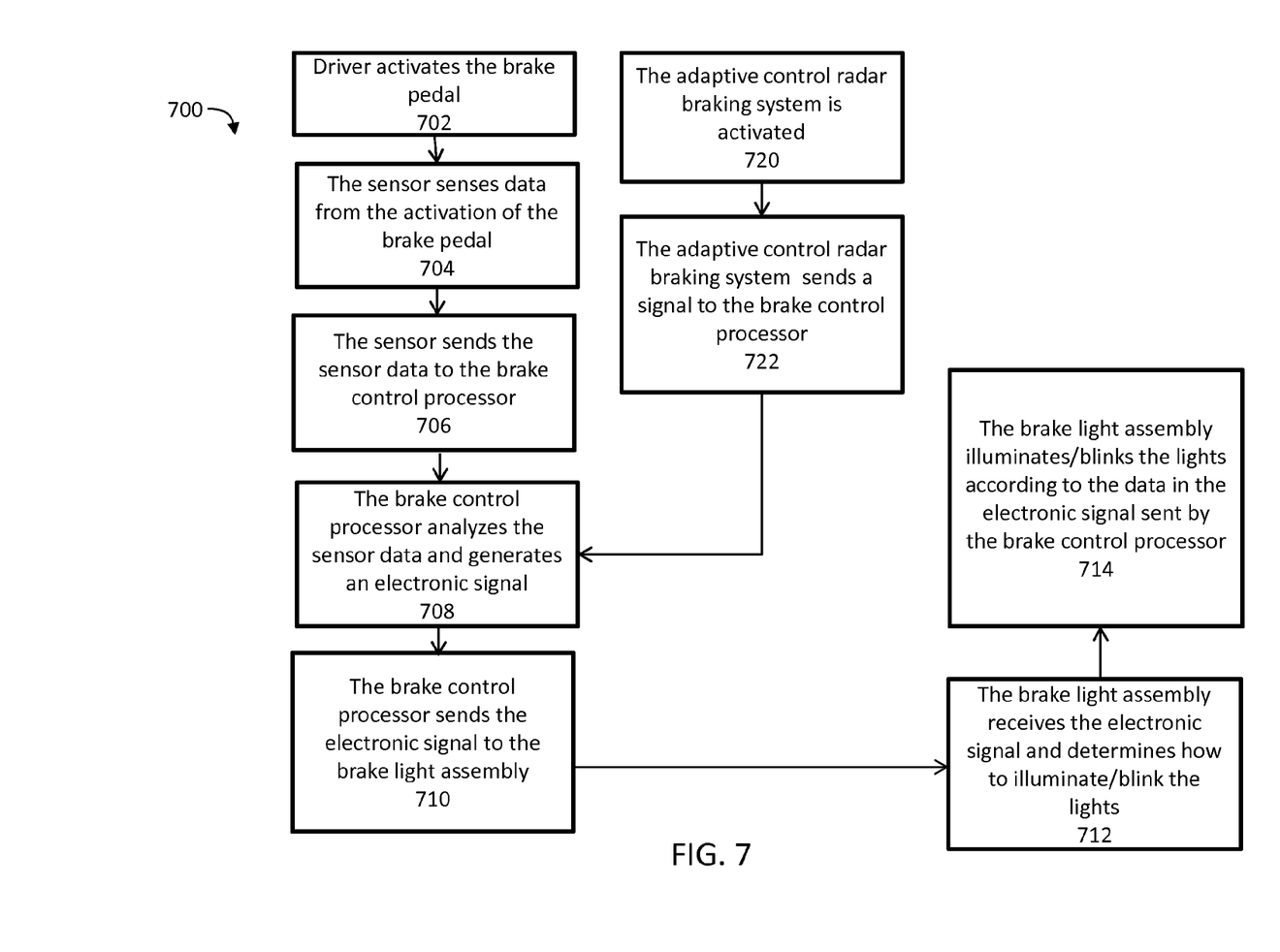
FIG. 7 is a flow chart depicting the method of the progressive braking indicator system, in accordance with one embodiment.

FIG. 7 is a flow chart depicting the method 700 of the progressive braking indicator system 100, in accordance with one embodiment. In step 702, the driver 101 activates the brake pedal 102, as shown in FIG. 2. In step 704, the sensor 103 senses the position, pressure, force, speed and/or acceleration of or on the brake pedal 102, as a result of the actions of the driver 101 of the vehicle and, in step 706, transmits at least one output signal (the output signal contains information on the position, pressure, force, speed and/or acceleration of or on the brake pedal 102) to the brake control processor 104. In step 708, the brake control processor 104 receives and deciphers and/or processes an output signal, wherein the output signal may be analyzed by the brake control processor 104 to generate at least one electronic signal, which is configured to actuate certain lights 105b of the plurality of lights 105a in the brake light assembly 105 based on the data received in the output signal from the sensor 103.

The brake control processor 104 may store (such as in a list or other data structure) data values that represent thresholds for position, pressure, force, speed and/or acceleration sensor readings, wherein the thresholds define which lights should be illuminated. For example, the brake control processor 104 may store data values that represent thresholds for brake pedal position and pressure, such that if the distance (measured by the sensor 103) is greater than a first distance threshold and the amount of pressure (measured by the sensor 103) is greater than a first pressure threshold, then a first set of the plurality of lights should be illuminated. If the distance is greater than a second distance threshold and the amount of pressure is greater than a second pressure threshold, then a second set of the plurality of lights, greater than the first set, should be illuminated. If the distance is greater than a third distance threshold and the amount of pressure is greater than a third pressure threshold, then a third set of the plurality of lights, greater than the second set, should be illuminated.

In one alternative in step 708, the signal generated by brake control processor 104 is configured to illuminate a first set of the plurality of lights if the distance (measured by the sensor 103) is greater than a first distance threshold and the amount of pressure (measured by the sensor 103) is greater than a first pressure threshold, or the signal is configured to illuminate a second set of the plurality of lights greater than the first set, if the distance is greater than a second distance threshold and the amount of pressure is greater than a second pressure threshold, or the signal is configured to illuminate a third set of the plurality of lights greater than the second set, if the distance is greater than a third distance threshold and the amount of pressure is greater than a third pressure threshold.

In another alternative in step 708, the signal is configured to illuminate a first set of the plurality of lights if the distance is greater than a first distance threshold, the amount of pressure is greater than a first pressure threshold, and the force (measured by the sensor 103) is greater than a first force threshold, or the signal is configured to illuminate a second set of the plurality of lights greater than the first set, if the distance is greater than a second distance threshold, the amount of pressure is greater than a second pressure threshold, and the force is greater than a second force threshold, or the signal is configured to illuminate a third set of the plurality of lights greater than the second set, if the distance is greater than a third distance threshold, the amount of pressure is greater than a third pressure threshold and, and the force is greater than a third force threshold.

In another alternative in step 708, the signal is configured to illuminate a first set of the plurality of lights if the distance is greater than a first distance threshold, the amount of pressure is greater than a first pressure threshold, and the speed (measured by the sensor 103) is greater than a first speed threshold, or the signal is configured to illuminate a second set of the plurality of lights greater than the first set, if the distance is greater than a second distance threshold, the amount of pressure is greater than a second pressure threshold, and the speed is greater than a second speed threshold, or the signal is configured to illuminate a third set of the plurality of lights greater than the second set, if the distance is greater than a third distance threshold, the amount of pressure is greater than a third pressure threshold and, and the speed is greater than a third speed threshold.

In another alternative in step 708, the signal is configured to illuminate a first set of the plurality of lights if the distance is greater than a first distance threshold, the amount of pressure is greater than a first pressure threshold, and the acceleration (measured by the sensor 103) is greater than a first acceleration threshold, or the signal is configured to illuminate a second set of the plurality of lights greater than the first set, if the distance is greater than a second distance threshold, the amount of pressure is greater than a second pressure threshold, and the acceleration is greater than a second acceleration threshold, or the signal is configured to illuminate a third set of the plurality of lights greater than the second set, if the distance is greater than a third distance threshold, the amount of pressure is greater than a third pressure threshold and, and the acceleration is greater than a third acceleration threshold.

In step 710, the brake control processor 104 transmits the electronic signal to the brake light assembly 105. The electronic signal may contain information received by the brake control processor 104 from the sensor 103. In step 712 the printed circuit board of the brake light assembly 105 receives the signal from the brake control processor 104 and determines how to illuminate/blink the lights according to the signal. In step 714, the printed circuit board of the brake light assembly 105 illuminates, with a level of intensity, or blinks at least one bulb 105b in the brake light assembly 105, according to the electronic signal from the brake control processor 104.

In one alternative, steps 720-722 are executed in lieu of steps 702-706. In this alternative, the progressive braking indicator system 100 may be activated by the adaptive control radar braking system 108. In this alternative, in step 720, the adaptive control braking radar system 108 is activated based on a braking scenario and/or based on sensor readings. (Note that in this embodiment, the system 100 can be activated by either 104 or 108 or both.) In step 722, the adaptive control braking radar system 108 generates a message that is transmitted to brake control processor 104. The message includes braking scenario gleaned from the sensors of the adaptive control braking radar system 108. The message may be analyzed by the brake control processor 104 in step 708 to generate at least one electronic signal, which is configured to actuate certain lights 105*b* of the plurality of lights 105*a* in the brake light assembly 105 based on the data received from the adaptive control braking radar system 108. Subsequently, steps 710-714 are executed.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A progressive braking indicator system for a vehicle, comprising:
   at least one brake light assembly comprising a plurality of lights;
   a brake pedal for the vehicle;
   an adaptive control braking radar system for receiving radar data and generating a message based on the radar data;
   a brake control processor connected to the adaptive control braking radar system and the at least one brake light assembly, wherein the brake control processor is configured to: a) receive the message from an adaptive control braking radar system, b) generate a signal based on the message, wherein the signal is configured to illuminate a first set of the plurality of lights if the message defines a braking scenario that exceeds a first intensity threshold, wherein the signal is configured to illuminate a second set of the plurality of lights greater than the first set, if the message defines a braking scenario that exceeds a second intensity threshold, and wherein the signal is configured to illuminate a third set of the plurality of lights greater than the second set, if the message defines a braking scenario that exceeds a third intensity threshold, and c) transmit the signal to the at least one brake light assembly; and
   a power source connected to the at least one brake light assembly and adaptive control braking radar system.

2. The progressive braking indicator system of claim 1, wherein the at least one brake light assembly further comprises a processor configured to receive the signal transmitted by the brake control processor and illuminate a set of lights defined by the signal.

3. The progressive braking indicator system of claim 2, wherein the adaptive control braking radar system is further configured for activating the brake pedal based on the radar data, wherein the brake pedal is activated to a first distance if the radar data defines a braking scenario that exceeds a first intensity threshold, wherein the brake pedal is activated to a second distance, if the radar data defines a braking scenario that exceeds a second intensity threshold, and wherein the brake pedal is activated to a third distance, if the radar data defines a braking scenario that exceeds a third intensity threshold.

4. The progressive braking indicator system of claim 3, further comprising:
   a sensor connected to the brake pedal for measuring a distance the brake pedal has moved and an amount of pressure applied to the brake pedal by a driver of the vehicle;
   a brake control processor connected to the sensor and the at least one brake light assembly, wherein the brake control processor is configured to: a) receive the distance and amount of pressure measured by the sensor, b) generate a signal based on the distance and amount of pressure measured by the sensor, wherein the signal is configured to illuminate a first set of the plurality of lights if the distance is greater than a first distance threshold and the amount of pressure is greater than a first pressure threshold, wherein the signal is configured to illuminate a second set of the plurality of lights greater than the first set, if the distance is greater than a second distance threshold and the amount of pressure is greater than a second pressure threshold, and wherein the signal is configured to illuminate a third set of the plurality of lights greater than the second set, if the distance is greater than a third distance threshold and the amount of pressure is greater than a third pressure threshold, and c) transmit the signal to the at least one brake light assembly.

* * * * *